(12) United States Patent
Katou

(10) Patent No.: US 10,540,829 B2
(45) Date of Patent: Jan. 21, 2020

(54) VEHICLE CONTROL SYSTEM

(71) Applicant: DENSO CORPORATION, Kariya, Aichi-pref. (JP)

(72) Inventor: Kenji Katou, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 239 days.

(21) Appl. No.: 15/548,952

(22) PCT Filed: Feb. 9, 2016

(86) PCT No.: PCT/JP2016/000659
§ 371 (c)(1),
(2) Date: Aug. 4, 2017

(87) PCT Pub. No.: WO2016/132707
PCT Pub. Date: Aug. 25, 2016

(65) Prior Publication Data
US 2018/0096540 A1    Apr. 5, 2018

(30) Foreign Application Priority Data
Feb. 20, 2015 (JP) ................................. 2015-031210

(51) Int. Cl.
*G06F 7/00* (2006.01)
*G06F 17/00* (2019.01)
(Continued)

(52) U.S. Cl.
CPC ........... *G07C 5/008* (2013.01); *G06F 3/0488* (2013.01); *G07C 9/00309* (2013.01); *H04B 5/0031* (2013.01)

(58) Field of Classification Search
CPC .... G07C 5/008; G07C 9/00309; B60R 25/24; G06F 3/0488; H04B 5/0031;
(Continued)

(56) References Cited

U.S. PATENT DOCUMENTS 6,377,173 B1 * 4/2002 Desai ..................... B60R 25/24
340/10.1
7,106,171 B1 * 9/2006 Burgess .................. B60R 25/23
340/10.42
(Continued)

FOREIGN PATENT DOCUMENTS

JP    2004312175 A    11/2004
JP    2010218006 A     9/2010
(Continued)

*Primary Examiner* — Khoi H Tran
*Assistant Examiner* — Jorge O Peche
(74) *Attorney, Agent, or Firm* — Harness, Dickey & Pierce, P.L.C.

(57) ABSTRACT

A vehicle control system includes a vehicular device mounted to a vehicle and a mobile key carried by a user. The vehicular device includes: a vehicular device communication unit communicating with the mobile key, and an acquisition unit acquiring vehicle state information reflecting a state of the vehicle. The vehicular device communication unit transmits the vehicle state information to the mobile key. The mobile key includes: a mobile key communication unit communicating with an external device; an operation unit including operation buttons; and an information generation unit generating operation command information reflecting an operation command set for each of the operation buttons when the operation buttons are operated. The mobile key communication unit receives the vehicle state information. The mobile key further includes a setting unit setting the operation command for each of the operation buttons based on the vehicle state information.

13 Claims, 7 Drawing Sheets

(51) Int. Cl.
*G07C 5/00* (2006.01)
*G06F 3/0488* (2013.01)
*G07C 9/00* (2006.01)
*H04B 5/00* (2006.01)

(58) Field of Classification Search
CPC ............ H04M 1/7253; H04M 1/6075; H04M 2250/04; H04Q 9/00
See application file for complete search history.

(56) References Cited

U.S. PATENT DOCUMENTS

| | | | | |
|---|---|---|---|---|
| 7,489,303 | B1* | 2/2009 | Pryor | B60K 35/00 345/173 |
| 9,982,645 | B2* | 5/2018 | Hirose | F02N 11/0807 |
| 2003/0078057 | A1* | 4/2003 | Watanabe | G01C 21/26 455/456.1 |
| 2004/0201492 | A1 | 10/2004 | Matsumoto | |
| 2005/0162260 | A1* | 7/2005 | Gupte | B60R 25/1004 340/426.18 |
| 2005/0242923 | A1* | 11/2005 | Pearson | G07C 9/00309 340/5.62 |
| 2005/0248436 | A1* | 11/2005 | Hohmann | B60R 25/24 340/5.72 |
| 2005/0277438 | A1* | 12/2005 | Tilk | B60R 25/2063 455/556.1 |
| 2006/0109080 | A1* | 5/2006 | Tang | G07C 9/00944 340/5.72 |
| 2006/0145811 | A1* | 7/2006 | Nantz | B60R 25/209 340/5.72 |
| 2006/0170241 | A1* | 8/2006 | Yamashita | B60R 25/2036 296/146.4 |
| 2006/0173587 | A1* | 8/2006 | Oesterling | B60R 25/00 701/2 |
| 2006/0206249 | A1* | 9/2006 | Fujioka | B60R 25/066 701/36 |
| 2008/0291047 | A1* | 11/2008 | Summerford | G07C 9/00182 340/5.71 |
| 2008/0309451 | A1* | 12/2008 | Zellweger | E05B 19/0082 340/3.32 |
| 2009/0212978 | A1* | 8/2009 | Ramseyer | G06Q 10/02 340/989 |
| 2009/0309696 | A1* | 12/2009 | Tsuruta | B60R 25/04 340/5.22 |
| 2010/0052845 | A1* | 3/2010 | Yamamoto | B60R 25/24 340/5.8 |
| 2010/0069115 | A1* | 3/2010 | Liu | H04M 1/72569 455/556.1 |
| 2010/0264688 | A1* | 10/2010 | Cheal | B60J 5/103 296/146.4 |
| 2011/0172885 | A1* | 7/2011 | Fawaz | G08C 17/02 701/48 |
| 2013/0116860 | A1 | 5/2013 | Kawai et al. | |
| 2014/0073262 | A1* | 3/2014 | Gutierrez | G08B 13/22 455/67.11 |
| 2014/0113619 | A1* | 4/2014 | Tibbitts | G07C 5/008 455/419 |
| 2015/0102900 | A1* | 4/2015 | Ramchandani | G08C 17/02 340/5.25 |
| 2015/0262441 | A1* | 9/2015 | Kim | B60R 25/00 340/5.6 |
| 2015/0363988 | A1* | 12/2015 | Van Wiemeersch | H04M 1/11 455/557 |
| 2016/0162126 | A1* | 6/2016 | Joo | G06F 3/016 715/830 |
| 2017/0232932 | A1* | 8/2017 | Nishidai | B60R 25/23 340/5.61 |
| 2018/0040172 | A1* | 2/2018 | Funk | G07C 5/008 |
| 2018/0257606 | A1* | 9/2018 | Weghaus | B60R 25/24 |

FOREIGN PATENT DOCUMENTS

| | | |
|---|---|---|
| JP | 2013049952 A | 3/2013 |
| JP | 2013100645 A | 5/2013 |
| JP | 2014125779 A | 7/2014 |

* cited by examiner

VEHICLE CONTROL SYSTEM

CROSS REFERENCE TO RELATED APPLICATIONS

This application is a U.S. National Phase Application under 35 U.S.C. 371 of International Application No. PCT/JP2016/000659 filed on Feb. 9, 2016 and published in Japanese as WO 2016/132707 A1 on Aug. 25, 2016. This application is based on and claims the benefit of priority from Japanese Patent Application No. 2015-31210 filed on Feb. 20, 2015. The entire disclosure of all the above application are incorporated herein by reference.

TECHNICAL FIELD

The present disclosure relates to a vehicle control system that controls a vehicle using wireless communication between a mobile key, which is carried by a user, and a vehicular device mounted in the vehicle.

BACKGROUND ART

An existing type of vehicle control system that is also referred to as a smart entry system performs authentication using wireless communication between a mobile key carried by a user and a vehicular device mounted in a vehicle and achieves an operation desired by the user, such as unlocking a door and starting an engine, on the basis on the result of the authentication without using a mechanical key.

A vehicle control system that changes vehicle control processing units appropriately based on a life cycle set according to the functions of vehicle control has been proposed (see Patent Literature 1).

A vehicle control apparatus that controls an opening/closing body of a vehicle using a mobile terminal that is carried by a user and includes a touch panel has been proposed (see Patent Literature 2).

A vehicle door control system has been proposed in which a mobile terminal is enabled to receive a state of a vehicle from a mobile key via widely known NFC (near field communication) and provide a service suitable for the state of the vehicle in a manner that corresponds to a change in state of the vehicle (see Patent Literature 3).

A wireless communication system has been proposed in which a mobile terminal receives a state of a vehicle or that of a mobile key from the mobile key and displays the state and an addressing method acquired through the Internet if the state needs to be addressed (see Patent Literature 4).

The number of part numbers cannot be reduced with the configuration described in Patent Literature 1 since a mobile key is not mounted in a vehicle. Additionally, such a criterion as a life cycle cannot be predicted accurately and thus is hard to apply to a mobile key.

In Patent Literature 2, an opening/closing body of a vehicle can be controlled using a mobile terminal. The mobile terminal communicates with the vehicle via a wireless LAN or a public communication line. Such a configuration requires a communication unit to be newly added to a mobile key and the vehicle because of the different communication system of the mobile terminal from that of the mobile key and the vehicle, thus leading to an increase in cost. Moreover, in comparison with the mobile key, the mobile terminal suffers a slower response time to an operation command (for example, the time taken from when the mobile terminal is operated until when a corresponding operation of the vehicle is finished), because the command is transmitted via the wireless LAN or the public communication line.

Mobile keys have different specifications for different vehicle models and different markets. First, the number of operation buttons is different in some cases (which makes different hardware). Additionally, the number of buttons may be the same, but the functions to be assigned to the buttons may be different. In such a case, pictograms representing the functions and formed (or affixed) on the surfaces of the buttons are different, and thus, different part numbers are assigned to the same hardware. Also, a function assigned to one of the buttons may not be necessarily suitable for the market or the state of a vehicle, in which case, the usability may be poor for a user.

The techniques described in Patent Literatures 2 to 4 can acquire the state of a vehicle or that of a mobile key via the public communication line or the mobile key. However, standardization of a mobile key or reduction in the number of its part numbers is not described or suggested in these Patent Literatures.

PRIOR ART LITERATURES

Patent Literature

Patent Literature 1: JP 2010-218006 A
Patent Literature 2: JP 2013-049952 A
Patent Literature 3: JP 2014-125779 A
Patent Literature 4: JP 2013-100645 A

SUMMARY OF INVENTION

It is an object of the present disclosure to provide a vehicle control system that offers enhanced usability of a mobile key and enables standardization of the mobile key or a reduction in the number of its part numbers.

A vehicle control system according to an aspect of the present disclosure includes a vehicular device mounted to a vehicle; and a mobile key to be carried by a user. The vehicular device includes a vehicular device communication unit, which communicates with the mobile key, and an acquisition unit, which acquires vehicle state information reflecting a state of the vehicle. The vehicular device communication unit, which transmits the vehicle state information to the mobile key. The mobile key includes a mobile key communication unit, which communicates with an external device, an operation unit, which includes one or more operation buttons, and an information generation unit, which generates operation command information reflecting an operation command set for each of the one or more operation buttons when the one or more operation buttons are operated. The mobile key communication unit receives the vehicle state information. The mobile key further includes a setting unit, which sets the operation command for each of the one or more operation buttons based on the vehicle state information.

With the configuration described above, a user does not have to carry a mobile terminal, unlike Patent Literature 2. The present disclosure can be achieved using a conventional hardware configuration, thereby inhibiting an increase in cost. Additionally, the mobile key is operated and thus has unchanged response time, which is faster than the configuration described in Patent Literature 2 where a mobile terminal is operated.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

Figure 1:
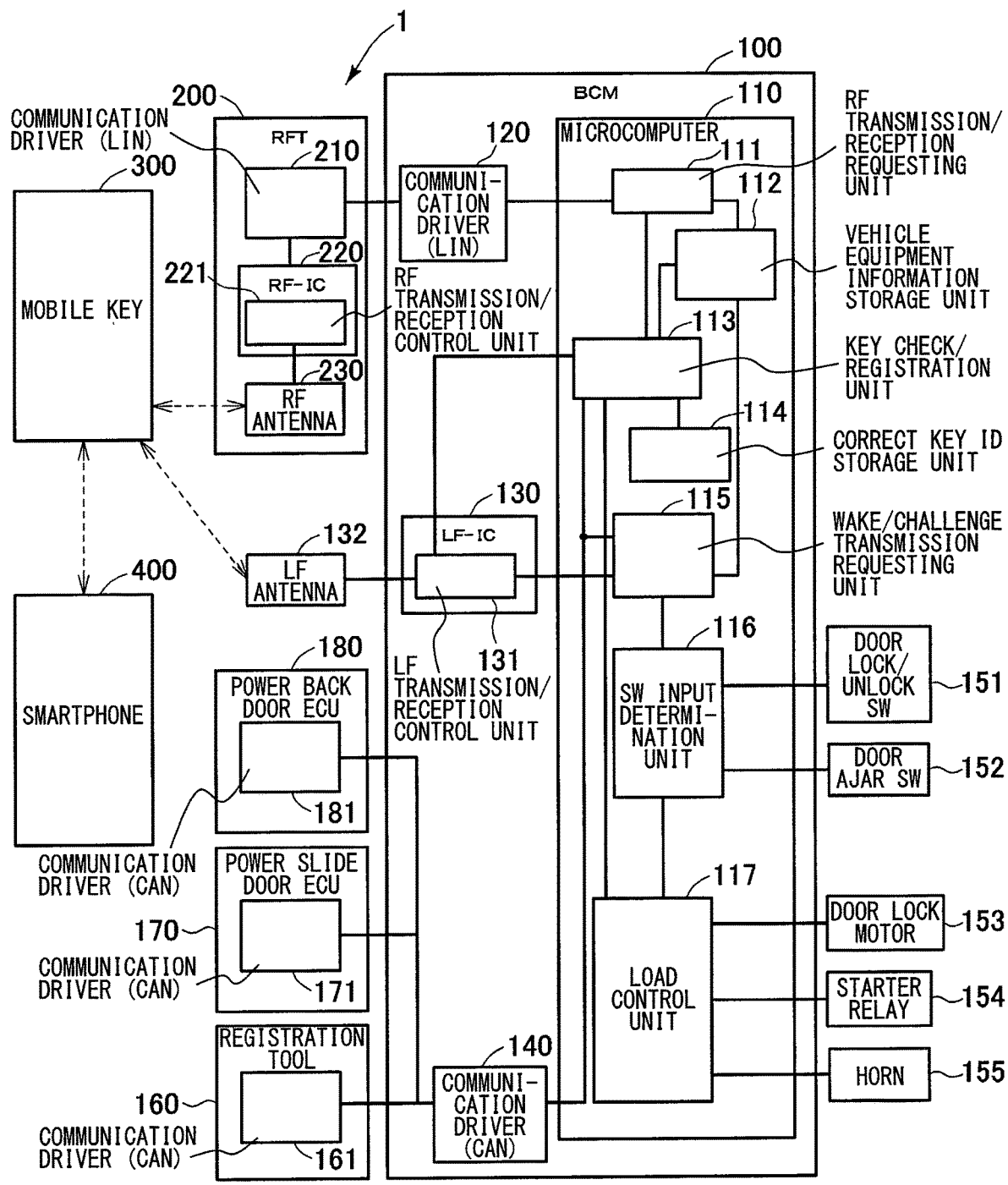
FIG. 1 is a diagram of exemplary configurations of a vehicle control system and a vehicular device.

As illustrated in FIG. 1, a vehicle control system 1 includes a BCM (body control module) 100 (corresponding to a vehicular device according to the present disclosure), a mobile key 300, which is carried by a user, and a smartphone 400 (corresponding to a mobile terminal according to the present disclosure). The smartphone 400 may be excluded in some of the configurations to be described below.

The BCM 100 controls the operation of, for example, a door lock, a power slide door, a power window, and a lamp of a vehicle and includes a microcomputer 110. It also includes a communication driver 120 (corresponding to an acquisition unit according to the present disclosure), an LF-IC 130, and a communication driver 140, which are connected to the microcomputer 110.

The microcomputer 110 may be a widely known one-chip microcomputer or collectively refer to a microprocessor, a memory, and a peripheral circuit. The microcomputer 110 executes a BCM control program stored in a memory included in the microcomputer 110 to achieve functions of the BCM 100.

The microcomputer 110 includes an RF transmission/reception requesting unit 111, a vehicle equipment information storage unit 112, a key check/registration unit 113, a correct key ID storage unit 114, a wake/challenge transmission requesting unit 115, a SW input determination unit 116, and a load control unit 117, which are functional blocks achieved using at least one of hardware and the BCM control program.

The RF transmission/reception requesting unit 111 outputs a data transmission/reception request to an RFT 200 (corresponding to a vehicular device according to the present disclosure) via the communication driver 120, which uses, for example, a widely known LIN (local interconnect network) as a communication protocol. The vehicle equipment information storage unit 112 is a memory that stores vehicle equipment information including a market of the vehicle and key information of the mobile key 300. The key check/registration unit 113 checks and registers a key ID for the identification of the mobile key 300. The correct key ID storage unit 114 is a memory that stores the correctly registered key ID of the mobile key 300.

The wake/challenge transmission requesting unit 115 outputs an instruction to transmit a wake request or a challenge request to the LF-IC 130. The wake request is to cause the mobile key 300 to transition from a sleep mode where the power consumption is small to a normal operation mode. The challenge request is to request the mobile key 300 to transmit a response signal.

The SW input determination unit 116 is attached, for example, near each door and the knob of a trunk of the vehicle to detect the state of a door lock/unlock SW (hereinafter referred to as a "door SW") 151 or a door ajar SW 152. The door lock/unlock SW 151 is operated to lock/unlock a corresponding one of the doors (which may include a back door and the trunk). The door ajar SW 152 indicates whether a door is ajar.

The load control unit 117 controls the operation of, for example, a door lock motor 153, a starter relay 154, and a horn (alternatively a buzzer or an alarm device) 155. The door lock motor 153 is included in a door lock device for locking/unlocking a door. The starter relay 154 switches on/off the power supply to a starter motor for starting the engine.

The LF-IC 130 includes an LF transmission/reception control unit 131 (corresponding to a vehicular device communication unit according to the present disclosure). The LF transmission/reception control unit 131 is connected to an LF antenna 132 (which is a generic term for all antennas) attached in, for example, each door and the trunk of the vehicle and in a cabin of the vehicle. In response to a control command from the microcomputer 110, the LF transmission/reception control unit 131 transmits and receives wireless signals to and from the mobile key 300 via the LF antenna 132 using radio waves in an LF (low frequency) band.

The communication driver 140 is a communication interface circuit that uses, for example, a widely known CAN (controller area network) as a communication protocol for data transmission to and from other vehicle devices. The communication driver 140 is connected to a registration tool 160, a power slide door ECU 170, and a power back door ECU 180. The registration tool 160 is provided outside the vehicle to set data in and read data from the BCM 100 or other vehicle devices. The power slide door ECU 170 enables opening/closing of a widely known power slide door. The power back door ECU 180 enables opening/closing of a widely known power back door. These ECUs include communication drivers 161, 171, and 181, respectively, that have configurations similar to that of the communication driver 140.

The BCM 100 is connected to the RFT (RF transceiver) 200, which is attached, for example, in a center console of the vehicle. The RFT 200 includes a communication driver 210, an RF-IC 220, and an RF antenna 230. The communication driver 210 has a configuration similar to that of the communication driver 120 for data transmission to and from the BCM 100.

The RF-IC 220 includes an RF transmission/reception control unit 221 (corresponding to a vehicular device communication unit according to the present disclosure). The RF transmission/reception control unit 221 is connected to the RF antenna 230. In response to a control command acquired from the microcomputer 110 via the communication driver 210, the RF transmission/reception control unit 221 transmits and receives wireless signals to and from the mobile key 300 via the RF antenna 230 using radio waves in an RF (high frequency) band.

Figure 2:
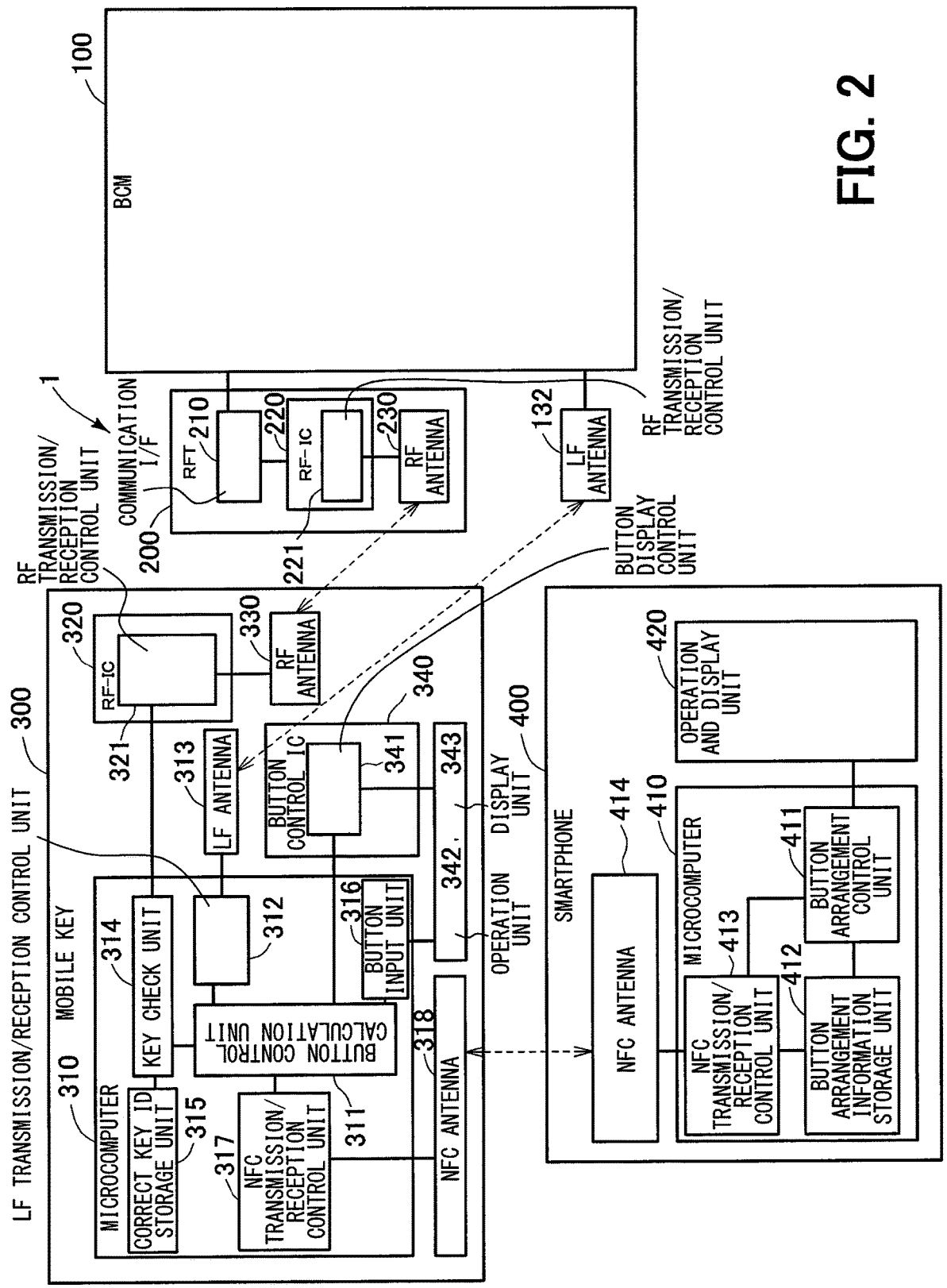
FIG. 2 is a diagram of exemplary configurations of a mobile key and a mobile terminal.

As illustrated in FIG. 2, the mobile key 300 includes an LF-IC with a built-in microcomputer (hereinafter abbreviated as a microcomputer) 310. The mobile key 300 also includes an LF antenna 313, an RF-IC 320, a button control IC 340, and an NFC antenna 318, which are connected to the microcomputer 310. The mobile key 300 also includes an RF antenna 330, an operation unit 342, and a display unit 343. The RF antenna 330 is connected to the RF-IC 320. The operation unit 342 and the display unit 343 are connected to the microcomputer 310 and the button control IC 340. The microcomputer 310 executes a mobile key control program stored in a memory included in the microcomputer 310 to achieve functions of the mobile key 300.

The microcomputer 310 includes a button control calculation unit 311 (corresponding to an information generation unit and a setting unit according to the present disclosure), an LF transmission/reception control unit 312 (corresponding to a mobile key communication unit according to the present disclosure), a key check unit 314, a correct key ID storage unit 315, a button input unit 316, and an NFC transmission/reception control unit 317 (corresponding to a mobile key communication unit according to the present disclosure), which are functional blocks achieved using at least one of hardware and the mobile key control program.

The button control calculation unit 311 acquires information from the LF transmission/reception control unit 312, the key check unit 314, the NFC transmission/reception control unit 317, and the button control IC 340, which are connected to the button control calculation unit 311. The button control calculation unit 311 performs calculation based on the acquired information and outputs a control command to each of the units described above on the basis of the result of the calculation.

In response to a control command from the button control calculation unit 311, the LF transmission/reception control unit 312 transmits and receives wireless signals to and from the BCM 100 via the LF antenna 313 connected to the LF transmission/reception control unit 312, using radio waves in the LF band. The key check unit 314 checks a key ID included in a wireless signal transmitted by the BCM 100 against a correct key ID stored in the correct key ID storage unit 315, which is a memory.

The button input unit 316 detects the state of an operation on an operation button (which may be abbreviated as a "button" hereinafter) included in the operation unit 342 and outputs the result to the button control calculation unit 311.

The button control calculation unit 311 reads an operation command that is stored, for example, in the correct key ID storage unit 315 and that is set for the button whose operation has been detected and generates operation command information that reflects the operation command. In accordance with the operation command, a processing internal to the mobile key 300 is performed and the operation command information is transmitted to the BCM 100 or the smartphone 400.

In response to a control command from the button control calculation unit 311, the NFC transmission/reception control unit 317 transmits and receives wireless signals to and from the smartphone 400 using the NFC technology via the NFC antenna 318, which is connected to the NFC transmission/reception control unit 317.

The RF-IC 320 includes an RF transmission/reception control unit 321 (corresponding to a mobile key communication unit according to the present disclosure). In response to a control command from the button control calculation unit 311, the RF transmission/reception control unit 321 transmits and receives wireless signals to and from the BCM 100 via the RF antenna 330.

The button control IC 340 includes a button display control unit 341. The button display control unit 341 outputs a display control command that includes display data to the display unit 343. In response to the display control command from the button display control unit 341, the display unit 343 displays a button and related information.

The configurations of the operation unit 342 and the display unit 343 include at least one of the following options.

i) The operation unit 342 includes a widely known LCD and a touch panel formed on a screen of the LCD. The display unit 343 displays on the screen a button and a pictogram that corresponds to an operation command set for the button.

ii) The operation unit 342 uses a widely known illuminated push button switch. The display unit 343 displays on an illuminated portion of the switch a pictogram that corresponds to an operation command set for the button. For example, more than one pictogram is printed on the illuminated portion in advance and one that corresponds to the operation command is illuminated. Alternatively, a dot matrix LCD is used for the illuminated portion to display a pictogram.

iii) The operation unit 342 uses a push button switch that is not an illuminated type. The display unit 343 uses an indicator, such as an LED, provided near the switch. The indicator, which corresponds to an operation command set for the button, is turned on.

In each of the configurations described above, the mobile key includes a display unit that displays an operation command set for an operation button. Each of the configurations allows a user to check a command currently set for the operation button and thereby provides enhanced convenience.

In the mobile key 300, when the button input unit 316 detects an operation on the operation unit 342, the button control calculation unit 311 generates the operation command information that reflects an operation command set for the operation unit 342. Then, the mobile key 300 transmits the operation command information to the BCM 100 via the LF transmission/reception control unit 312 or the RF transmission/reception control unit 321.

As illustrated in FIG. 2, the smartphone 400 is a tablet-type terminal, which is a mobile information terminal that includes a touch panel mounted in a display portion, such as a liquid crystal display, and is operable by a finger. Any type of mobile information terminal other than the tablet-type terminal such as the smartphone 400 may be of course used.

The smartphone 400 includes a microcomputer 410, an NFC antenna 414 connected to the microcomputer 410, and an operation/display unit (hereinafter abbreviated as a "display unit") 420 (corresponding to a mobile terminal display unit and a mobile terminal setting unit according to the present disclosure). The display unit 420 includes an LCD and a touch panel formed on a screen of the LCD.

The microcomputer 410 has a configuration similar to that of the microcomputer 110. The microcomputer 410 executes an application program stored in a memory included in the microcomputer 410 to achieve functions of the smartphone 400.

The microcomputer 410 includes a button arrangement control unit 411 (corresponding to a mobile terminal setting unit according to the present disclosure), a button arrangement information storage unit 412, and an NFC transmission/reception control unit 413 (corresponding to a mobile terminal communication unit according to the present disclosure), which are functional blocks achieved using at least one of hardware and the application program.

The button arrangement control unit 411 reads button arrangement information stored in the button arrangement information storage unit 412, which is a memory, and outputs a display control command based on the information to the display unit 420. In response to the display control command, the display unit 420 performs displaying.

The NFC transmission/reception control unit 413 has a configuration similar to that of the NFC transmission/reception control unit 317 and transmits and receives wireless signals to and from the mobile key 300 via the NFC antenna 414, which is connected to the NFC transmission/reception control unit 413.

Figure 3:
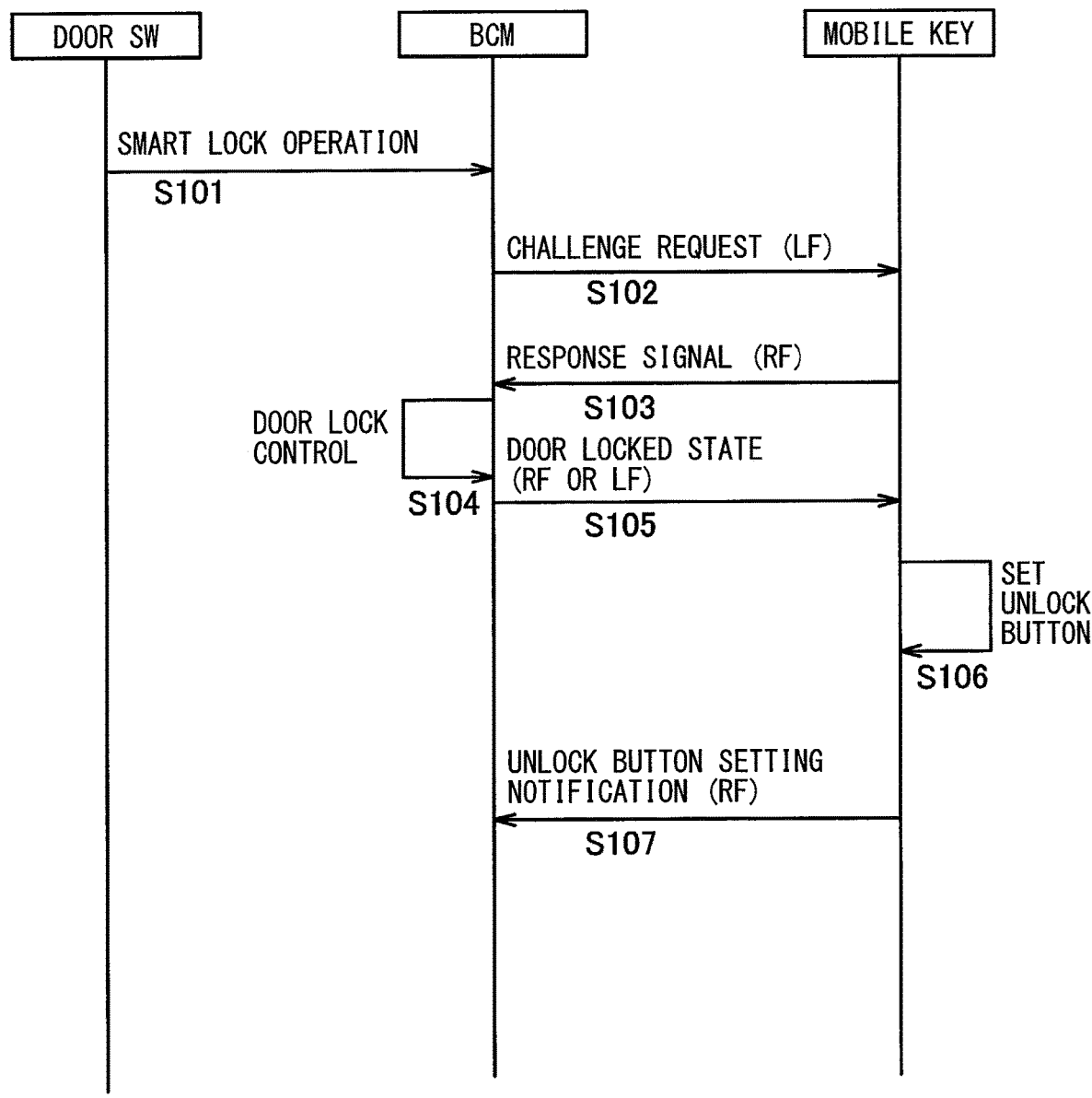
FIG. 3 is a sequence diagram for describing processing of setting an operation button in accordance with a state of a vehicle.

FIG. 3 is a sequence diagram for describing processing of setting an operation button in accordance with a state of a vehicle in an example of a door locking operation by a user. The smartphone 400 is not needed in a configuration described here. In this configuration, a setting unit sets an operation command executable in the state of the vehicle. The configuration does not require a mobile terminal, unlike Patent Literature 2 where a mobile terminal is used, thus leading to a reduction in cost and, furthermore, enhanced user convenience. Additionally, a nonexecutable command is not set; thus, the number of operation buttons can be reduced.

If an operation on the door SW 151 (that is, a smart lock operation) by a user of a vehicle is detected (S101), the microcomputer 110 of the BCM 100 transmits a challenge request to the mobile key 300 via the LF transmission/reception control unit 312 (S102). The challenge request includes a wake ID that identifies the BCM 100 and data indicative of the challenge request. A wake request may be transmitted before the transmission of the challenge request.

Upon reception of the challenge request by the microcomputer 310 of the mobile key 300 via the LF transmission/reception control unit 313, the key ID check unit 314 checks the wake ID included in the challenge request against a wake ID stored in the correct key ID storage unit 315. If the result of the check indicates the agreement of the wake IDs, the microcomputer 310 transmits a response signal that includes a key ID stored in the correct key ID storage unit 315 via the RF transmission/reception control unit 321 (S103).

Upon reception of the response signal by the microcomputer 110 of the BCM 100 via the RF transmission/reception control unit 221, the key check/registration unit 113 checks the key ID included in the response signal against a key ID stored in the correct key ID storage unit 114. If the result of the check indicates the agreement of the key IDs, the load control unit 117 outputs a door lock command to the door lock motor 153 (S104).

If the operation on the door SW 151 is for a power slide door or a power back door, the microcomputer 110 outputs a control command in accordance with the operation to the corresponding ECU 170 or 180 via the communication driver 140.

Then, the load control unit 117 acquires a door locked state (it can be locked or unlocked) on the basis of the actuation state of the door lock motor.

Upon acquisition of the door locked state, the microcomputer 110 of the BCM 100 transmits the door locked state to the mobile key 300 via the LF transmission/reception control unit 312 or the RF transmission/reception control unit 221 (S105). Since a user often moves away from a vehicle particularly after locking a door, the door locked state can reach the mobile key 300 more reliably by using radio waves in the RF band, which has a farther range than the LF band.

Upon reception of the door locked state by the microcomputer 310 of the mobile key 300 via the LF transmission/reception control unit 312 or the RF transmission/reception control unit 221, the button control calculation unit 311 instructs the button control IC 340 to change the operation command set for a button. That is, the button previously used as a lock button is set as an unlock button (S106).

When the setting of the button (that is, the operation command) has been changed, the microcomputer 310 transmits an unlock button setting notification to the BCM 100 via the RF transmission/reception control unit 221 (S107).

Figure 5:
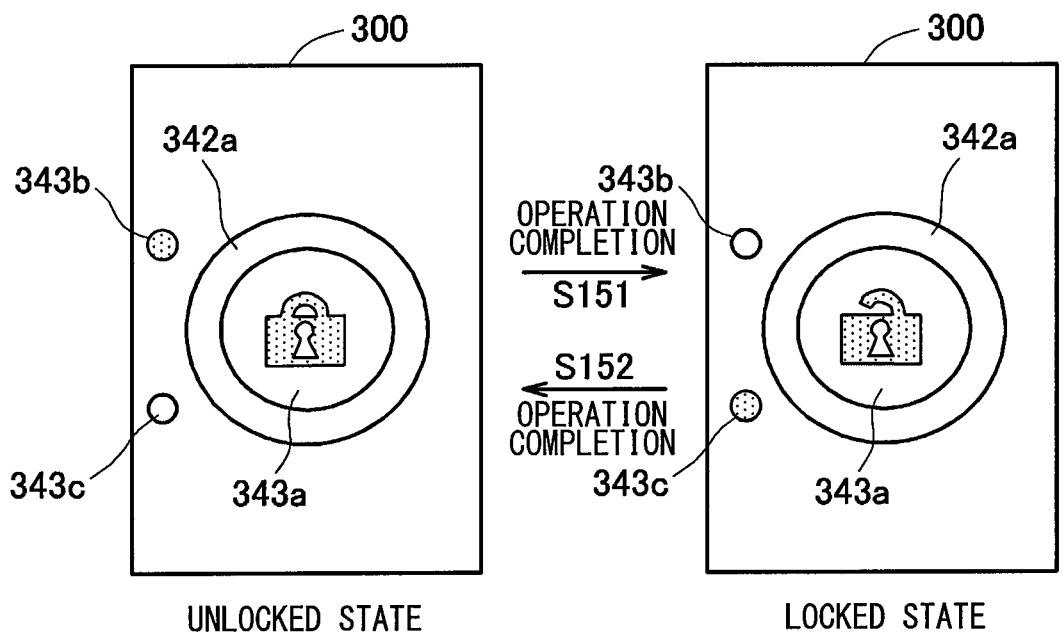
FIG. 5 is a diagram of a state transition of setting of an operation button in the case of a one-button mobile key.

In FIG. 5, a state transition of the setting of a button is illustrated in the case of a one-button mobile key 300 that uses one button 342a as the operation unit 342. The button 342a is an illuminated push button switch described above. The button 342a has an illuminated portion that serves as a display unit 343a on a top surface at the center. The display unit 343a displays a pictogram that corresponds to the setting of the button 342a (that is, the operation command). If the button 342a is not an illuminated push button switch, LEDs 343b and 343c (which are display units) may be provided near the button 342a.

It is not plausible that a user operates to unlock a door when it is unlocked. Hence, the button control calculation unit 311 sets an operation command to use the button 342a as a lock button. The button display control unit 341 displays a pictogram that indicates a lock button on the display unit 343a. Alternatively, the button display control unit 341 turns on the LED 343b, which indicates a lock button (and the LED 343c is turned off).

In the state described above, when a user operates on the button 342a (or operates the door SW 151 to lock), the door is locked. In S105 in FIG. 3, when the BCM 100 transmits the door locked state to the mobile key 300 (S151), the button control calculation unit 311 sets an operation command to use the button 342a as an unlock button. Then, the button display control unit 341 displays a pictogram that indicates an unlock button on the display unit 343a. Alternatively, the button display control unit 341 turns on the LED 342c, which indicates the unlock button (and the LED 342b is turned off).

In the state described above, when a user presses the button 342a (or operates the door SW 151 to unlock), the door is unlocked. Subsequently, the BCM 100 transmits the door unlocked state, which indicates that the door has been unlocked, to the mobile key 300 (S152). Then, the button control calculation unit 311 sets the operation command to use the button 342a as a lock button.

Figure 4:
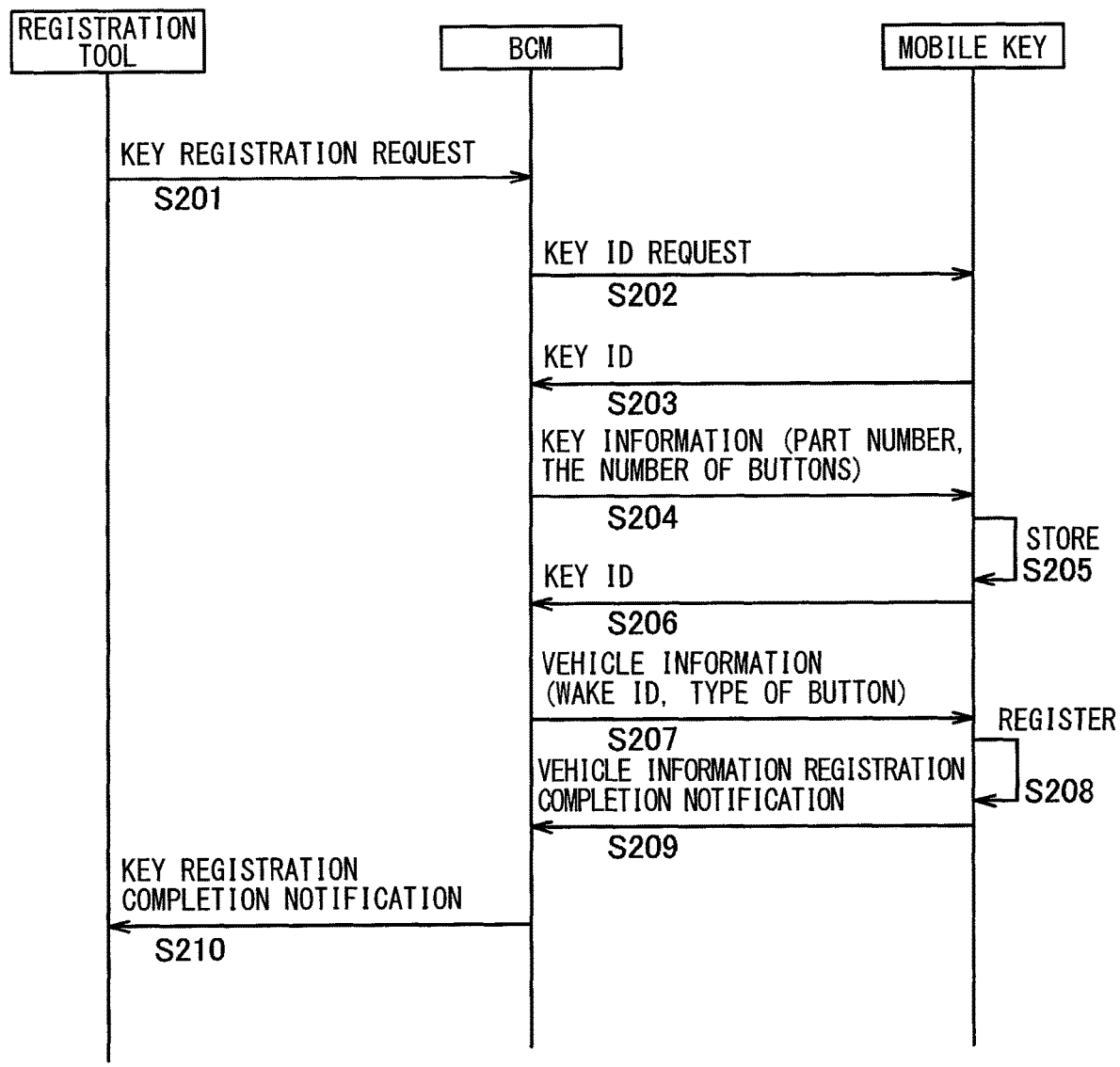
FIG. 4 is a sequence diagram for describing processing of setting an operation button in accordance with a specification of the vehicle.

FIG. 4 is a sequence diagram for describing processing of setting an operation button in accordance with a specification of a vehicle. The smartphone 400 is not needed in a configuration described here. In this configuration, vehicle state information includes the key information, which includes an operation command settable for an operation button and the number of operation buttons;

the setting unit in the mobile key sets an operation command for an operation button on the basis of the key information. The key information (that is, the specification) is different for different vehicle models and different markets. The configuration allows one type of mobile key (for example, hardware) to work for more than one vehicle model and more than one market, thus enabling standardization of mobile keys and a reduction in the number of part numbers. The processing described below is used to register, for example, a new mobile key 300 in the BCM 100.

The registration tool 160 connected to the BCM 100 is operated to transmit a key registration request to the BCM 100 (S201). The BCM 100 communicates with the mobile key 300 using radio waves in the LF band.

Upon reception of the key registration request, the microcomputer 110 of the BCM 100 requests a key ID from the mobile key 300 (S202). Upon reception of the key ID request by the microcomputer 310 of the mobile key 300, the button control calculation unit 311 reads a key ID from the correct key ID storage unit 315 via the key check unit 314 and transmits the key ID to the BCM 100 (S203).

Upon reception of the key ID by the microcomputer 110 of the BCM 100, the key check/registration unit 113 stores the key ID in the correct key ID storage unit 114. Then, the key information, which includes the part number of the mobile key (which corresponds to the market or the type of the vehicle) and the number of buttons, is transmitted to the mobile key 300 (S204). The key information may be stored in the vehicle equipment information storage unit 112 in advance. In this case, the key check/registration unit 113 reads the key information. The key information may be received from the registration tool 160 in S201 described above. Here, the key information received is stored in the vehicle equipment information storage unit 112 (S205).

Operation commands settable in the button input unit 316 of the mobile key 300 and priorities of the operation commands are associated with part numbers. The operation commands, together with the part numbers, may be included in the key information. Alternatively, a data table associating the part numbers and the operation commands may be stored in the correct key ID storage unit in advance.

Upon reception of the key information, the microcomputer 310 of the mobile key 300 transmits the key ID as in the case of S203 (S206). The microcomputer 110 of the BCM 100 can verify the reception of the key information by the target mobile key 300 by checking the received key ID in the key check/registration unit 113.

Then, the key check/registration unit 113 in the microcomputer 110 of the BCM 100 reads vehicle information that is stored in the vehicle equipment information storage unit 112 and that is information to, for example, identify the BCM 100 and transmits the vehicle information to the mobile key 300 (S207). The vehicle information includes a wake ID to be included in a challenge request to be transmitted by the BCM 100 and the type of button that indicates whether the operation unit 342 is a push button switch or a touch panel. The type of button may be included in the key information.

Upon reception of the vehicle information by the microcomputer 310 of the mobile key 300, the button control calculation unit 311 registers the vehicle information in the correct key ID storage unit 315 via the key check unit 314 (S208). Then, a vehicle information registration completion notification is transmitted to the BCM 100 (S209). Upon reception of the vehicle information registration completion notification, the microcomputer 110 of the BCM 100 transmits a key registration completion notification to the registration tool 160 (S210).

Figure 6:
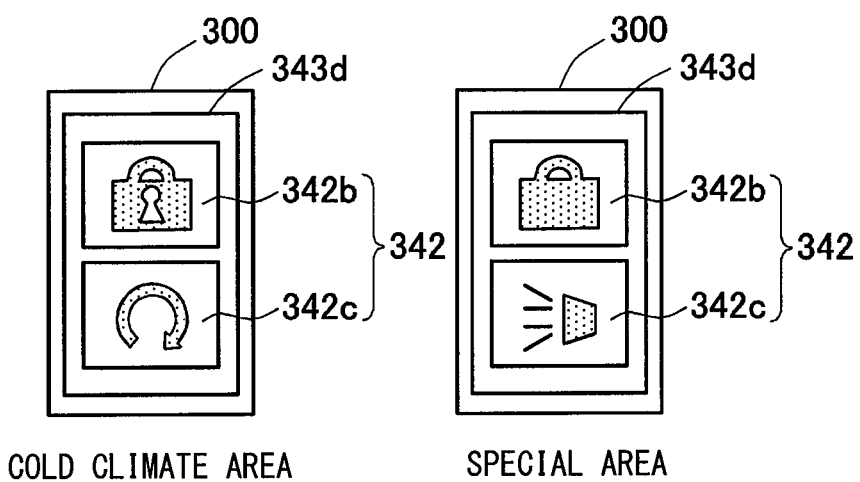
FIG. 6 is a diagram of examples of setting of an operation button for different places for shipment in the case of a two-button mobile key.

In FIG. 6, examples of setting of a button for different markets are illustrated in the case of a two-button mobile key 300 that uses two buttons 342b and 342c of a touch panel type as the operation unit 342. A display unit 343d uses an LCD and thus can display any number of buttons. The button control calculation unit 311 determines the number of buttons and their placement on the basis of the number of buttons included in the key information and the type of button included in the vehicle information received from the BCM 100. The button control calculation unit 311 also sets an operation command for a button on the basis of the part number included in the key information.

Two types of markets are illustrated in FIG. 6 as examples, namely, a "cold climate area" and a "special area." For the "cold climate area," an operation command to use a button 342b as a lock button is set for the display unit 343d, and a pictogram that indicates the lock button is displayed in a display area of the button 342b. An operation command is also set to use a button 342c as a remote start button to start an engine from a location away from the vehicle, and a pictogram that indicates the remote start button is displayed in a display area of the button 342c. As in the case with FIG. 5, the button 342b changes its setting and display depending on the state of door lock.

For the "special area," the button 342b is used as a lock button as in the case with the "cold climate area." An operation command is set to use the button 342c as a panic alarm button, in place of the remote start button, to provide a panic alarm by sounding a horn or buzzer and turning on the lamp regardless of the activation state of a burglar alarm, and a pictogram that indicates the panic alarm button is displayed in the display area of the button 342c. This is for the safety of users who use the vehicle in an unsafe area.

Figure 7:
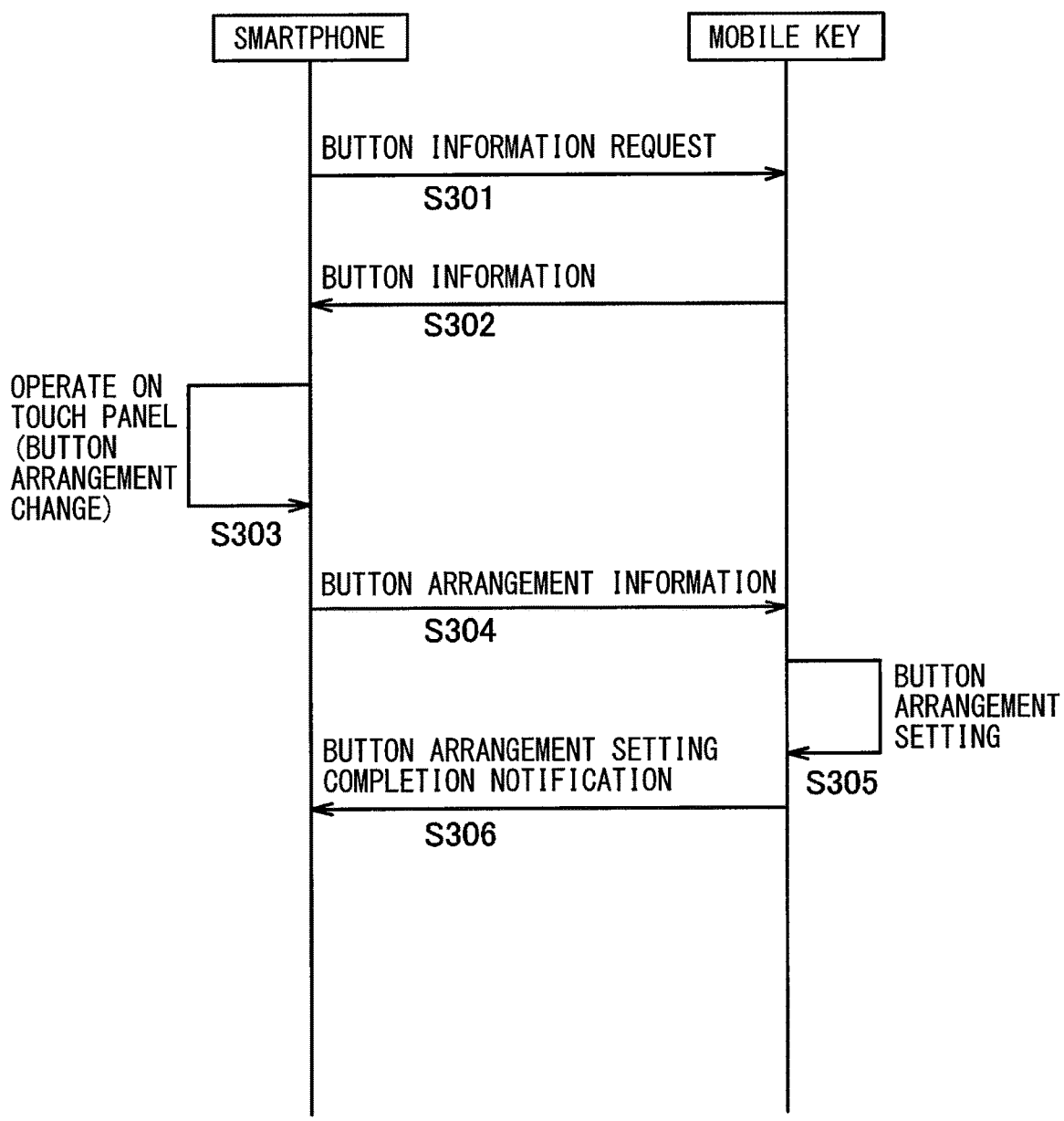
FIG. 7 is a sequence diagram for describing processing of setting a button arrangement using a smartphone.

FIG. 7 is a sequence diagram for describing processing of setting a button arrangement using the smartphone 400 and the mobile key 300. In this processing, the smartphone 400 and the mobile key 300 communicate with each other using the respective NFC transmission/reception control units 317 and 413. When the mobile key 300 is held over the smartphone 400 (the mobile key 300 is brought within a communication distance from the smartphone 400), the smartphone 400 transmits a button information request to the mobile key 300 (S301). For example, the smartphone 400 transmits a search signal for searching for the mobile key 300 regularly. Upon reception of a search signal, the mobile key 300 transmits a response signal. In this manner, it can be determined whether the mobile key 300 is near the smartphone 400.

Upon reception of the button information request, the button control calculation unit 311 of the mobile key 300 reads button information from the correct key ID storage unit 315 via the key check unit 314 and transmits the button information to the smartphone 400 (S302). The button information includes the number of buttons, a button arrangement, and an operation command settable for a button.

Upon reception of the button information, the button arrangement control unit 411 in the microcomputer 410 of the smartphone 400 displays a button arrangement change screen in the display unit 420 on the basis of the button information.

The configuration described above includes a mobile terminal, which is carried by a user; the mobile terminal includes the mobile terminal communication unit, which receives the key information from the mobile key, and the mobile terminal display unit, which displays the key information. This configuration allows a current setting state of a button and a settable operation command to be verified using the mobile terminal.

Figure 8:
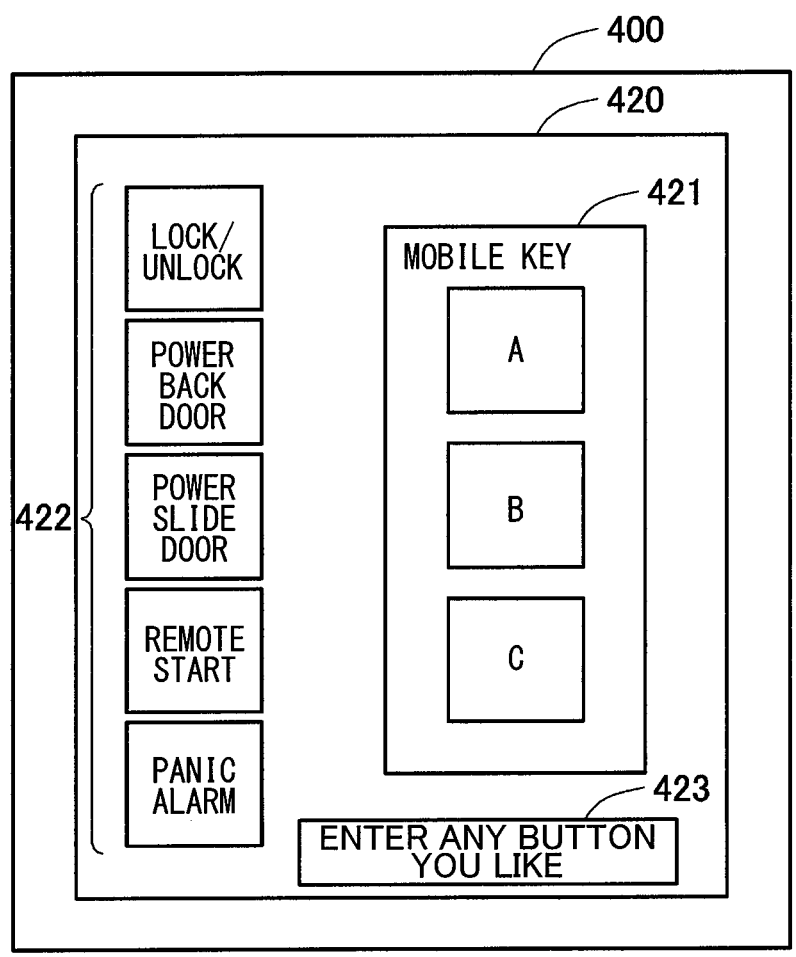
FIG. 8 is a diagram of an example display of a button arrangement change screen.

FIG. 8 is a diagram of example display of the button arrangement change screen. The display unit 420 displays a mobile key display area 421 that mimics a button arrangement of the mobile key 300, a command display area 422 that displays in the form of an icon an operation command settable for the operation unit 342 of the mobile key 300, and a message display area 423. The command display area 422 can be scrolled when all functions cannot be displayed in the screen.

In FIG. 8, a three-button mobile key that includes three buttons A, B, and C in the operation unit 342 is illustrated as an example. A method of associating an operation command with a button uses at least one of the following options.

i) An operation command is selected from (by touching) the command display area 422, and a button is selected from the mobile key display area 421.

ii) While an operation command is being selected from the command display area 422, it is moved to (or dragged and dropped in) a button in the mobile key display area 421.

With reference back to FIG. 7, when a button arrangement has been set, an area outside the button display area of the mobile key display area 421 or the message display area 423 is touched. Then, the button arrangement control unit 411 stores the achieved setting in the button arrangement information storage unit 412 (S303). Subsequently, the button arrangement control unit 411 transmits the button arrangement information that reflects the setting to the mobile key 300 (S304).

Upon reception of the button arrangement information, the button control calculation unit 311 of the mobile key 300 changes the setting for the operation command for each of the buttons of the operation unit 342 on the basis of the button arrangement information. A control command is also transmitted to the button display control unit 341 to provide display on the button display unit (for example, 342b and 342c in FIG. 6) on the basis of the button arrangement information (S305). When the button arrangement has been changed, a button arrangement change completion notification is transmitted to the smartphone 400 (S306).

In the configuration described above, a mobile terminal includes the mobile terminal setting unit that sets an operation command for an operation button on the basis of the key information. The mobile terminal communication unit transmits button information that reflects the setting to a mobile key. The mobile key communication unit in the mobile key receives the button information, and the setting unit sets the operation command for the operation button on the basis of the button information. The configuration allows a user to set an operation command in accordance with the preference or operation tendency of the user, thereby providing enhanced user convenience.

Upon reception of the button arrangement change completion notification, the smartphone 400 may provide display to that effect on the display unit 420.

The button arrangement change using the smartphone 400 (FIG. 7) may take priority over the display setting of buttons in accordance with the specification of a vehicle (FIG. 4). In this manner, a user preference can be given priority, and thereby enhanced convenience is provided.

It is noted that a flowchart or the processing of the flowchart in the present application includes sections (also referred to as steps), each of which is represented, for instance, as S101. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A vehicle control system, comprising:
a vehicular device mounted to a vehicle; and
a mobile key carried by a user, wherein
the vehicular device includes
a vehicular device communication unit, which communicates with the mobile key, and
an acquisition unit, which acquires vehicle state information reflecting a state of the vehicle;
the vehicular device communication unit transmits the vehicle state information to the mobile key;
the mobile key includes
a mobile key communication unit, which communicates with an external device,
an operation unit, which includes one or more operation buttons, and
an information generation unit, which generates operation command information reflecting an operation command set for each of the one or more operation buttons when the one or more operation buttons are operated;
the mobile key communication unit receives the vehicle state information; and
the mobile key further includes a setting unit, which changes a setting of the operation command in response to a change in the vehicle state information for each of the one or more operation buttons.

2. The vehicle control system according to claim 1, wherein the setting unit sets the operation command executable in the state of the vehicle.

3. The vehicle control system according to claim 1, wherein the mobile key further includes a display unit, which displays the operation command set for each of the one or more operation buttons.

4. The vehicle control system according to claim 1, wherein:
the vehicle state information includes key information; and
the key information includes
an operation command settable for each of the one or more operation buttons, and
a numerical number of the one or more operation buttons; and
the setting unit in the mobile key sets the operation command for each of the one or more operation buttons based on the key information.

5. The vehicle control system according to claim 4, further comprising:
a mobile terminal carried by the user,
wherein the mobile terminal includes:
a mobile terminal communication unit, which receives the key information from the mobile key; and
a mobile terminal display unit, which displays the key information.

6. The vehicle control system according to claim 5, wherein:
the mobile terminal further includes a mobile terminal setting unit, which sets the operation command for each of the one or more operation buttons based on the key information;

the mobile terminal communication unit transmits button information reflecting a content, which is set by the mobile terminal communication unit, to the mobile key;

the mobile key communication unit in the mobile key receives the button information; and the setting unit sets the operation command for each of the one or more operation buttons based on the button information.

7. A vehicle control system, comprising:
a vehicular device mounted to a vehicle; and
a mobile key carried by a user, wherein
the vehicular device includes
    a vehicular device communication unit, which communicates with the mobile key, and
    an acquisition unit, which acquires vehicle state information reflecting a state of the vehicle;
the vehicular device communication unit transmits the vehicle state information to the mobile key;
the mobile key includes
    a mobile key communication unit, which communicates with an external device,
    an operation unit, which includes one or more operation buttons, and
    an information generation unit, which generates operation command information reflecting an operation command set for each of the one or more operation buttons when the one or more operation buttons are operated;
the mobile key communication unit receives the vehicle state information;
the mobile key further includes a setting unit, which sets the operation command for each of the one or more operation buttons based on the vehicle state information;
the vehicle state information includes key information; and
the key information includes
    an operation command settable for each of the one or more operation buttons, and
    a numerical number of the one or more operation buttons.

8. A vehicle control system, comprising:
a vehicular device for mounting in a vehicle, the vehicular device including
    a body control module having
        a microcomputer,
        a local interconnect network (LIN) communication driver, and
        a low frequency radio frequency integrated circuit (LFIC), and
    a radio frequency transceiver including a radio frequency integrated circuit (RFIC); and
a mobile key for carrying by a user of the vehicle, the mobile key including
    a microcomputer,
    one or more operation buttons for inputting commands to the microcomputer of the mobile key,
    a low frequency transceiver,
    a near-field communication (NFC) transceiver, and
    a radio frequency integrated circuit (RFIC), wherein
the LIN communication driver is configured to acquire vehicle state information that reflects a state of the vehicle, and wherein
the LFIC of the body control module is configured to communicate with the low frequency transceiver of the mobile key, to receive the vehicle state information from the LIN communication driver, and to transmit the vehicle state information to the low frequency transceiver of the mobile key, and wherein the RFIC of the radio frequency transceiver of the vehicular device is configured to communicate with the RFIC of the mobile key, to receive the vehicle state information from the LIN communication driver, and to transmit the vehicle state information to the RFIC of the mobile key, and wherein the low frequency transceiver of the mobile key is configured to communicate with the LFIC of the body control module and to receive the vehicle state information from the LFIC of the body control module, and wherein the RFIC of the mobile key is configured to communicate with the RFIC of the vehicular device and to receive the vehicle state information from the RFIC of the vehicular device, and wherein the microcomputer of the mobile key is configured
    to generate operation command information reflecting an operation command set for each of the one or more operation buttons in response to the one or more operation buttons being operated, and
    to change a setting of the operation command for each of the one or more operation buttons in response to a change in the vehicle state information.

9. The vehicle control system according to claim 8, wherein
the microcomputer of the mobile key is further configured to set the operation command executable in the state of the vehicle.

10. The vehicle control system according to claim 8, wherein
the mobile key further includes a display unit that displays the operation command set for each of the one or more operation buttons.

11. The vehicle control system according to claim 8, wherein
the vehicle state information includes key information that includes
    an operation command settable for each of the one or more operation buttons, and
    a numerical number of the one or more operation buttons, and wherein
the microcomputer of the mobile key is further configured to set the operation command for each of the one or more operation buttons based on the key information.

12. The vehicle control system according to claim 11, further comprising:
a mobile terminal for carrying by the user, the mobile terminal including
    near field communication (NFC) transceiver, and
    a mobile terminal display unit, wherein
the NFC transceiver of the mobile key is further configured to output the key information, and wherein
the NFC transceiver of the mobile terminal is configured to receive the key information from the NFC transceiver of the mobile key, and wherein
the mobile terminal display unit is configured to display the key information.

13. The vehicle control system according to claim 12, wherein
the mobile terminal further includes a microcomputer configured to set the operation command for each of the one or more operation buttons based on the key information, and wherein the NFC transceiver of the mobile terminal is further configured to transmit button information that reflects the operation command for each of the one or more operation buttons set by the microcomputer of the mobile terminal to the mobile key, and wherein
the NFC transceiver of the mobile key is further configured to receive the button information from the NFC transceiver of the mobile terminal, and wherein
the microcomputer of the mobile key is further configured to set the operation command for each of the one or more operation buttons based on the button information.

* * * * *